US006985107B2

(12) United States Patent  
Anson et al.

(10) Patent No.: US 6,985,107 B2  
(45) Date of Patent: Jan. 10, 2006

(54) RANDOM ANTENNA ARRAY INTERFEROMETER FOR RADIO LOCATION

(75) Inventors: Peter Anson, Aurora (CA); George Niezgoda, Toronto (CA)

(73) Assignee: Lotek Wireless, Inc., Newmarket (CA)

( * ) Notice: Subject to any disclaimer, the term of this patent is extended or adjusted under 35 U.S.C. 154(b) by 147 days.

(21) Appl. No.: 10/615,964

(22) Filed: Jul. 9, 2003

(65) Prior Publication Data

US 2005/0007278 A1 Jan. 13, 2005

(51) Int. Cl.  
*G01S 3/02* (2006.01)

(52) U.S. Cl. ....................................... 342/451; 342/465
(58) Field of Classification Search ................. 342/451, 342/442, 465, 360; 702/190
See application file for complete search history.

(56) References Cited

U.S. PATENT DOCUMENTS

| | | | |
|---|---|---|---|
| 4,559,605 A | 12/1985 | Norsworthy | |
| 4,728,959 A | 3/1988 | Maloney et al. | |
| 5,444,451 A | 8/1995 | Johnson et al. | |
| 5,969,676 A | 10/1999 | Tran et al. | |
| 6,104,344 A * | 8/2000 | Wax et al. | 342/378 |
| 6,112,095 A | 8/2000 | Wax et al. | |
| 6,140,964 A * | 10/2000 | Sugiura et al. | 342/464 |
| 6,259,404 B1 | 7/2001 | Parl et al. | |
| 6,297,773 B1 | 10/2001 | Fullerton et al. | |
| 6,388,618 B1 | 5/2002 | Stilp et al. | |
| 6,504,483 B1 | 1/2003 | Richards et al. | |

FOREIGN PATENT DOCUMENTS

EP   000932049 A2 *   7/1999

OTHER PUBLICATIONS

Baum, Carl E., "Signature-Based Target Identification and Pattern Recognition," IEEE Antennas and Propagation Magazine, vol. 36, no. 3, Jun. 1994, pp. 44–51.*

Michal, Debra P. et al, "Multiple Target Detection for an Antenna Array Using Outlier Rejection Methods," ICASSP-93, Apr. 1993, pp. 45–48, vol. 4.*

Schmidt, Ralph O., "Multilinear Array Manifold Interolation," IEEE Transactins on Signal Processing, vol. 40, no. 4, Apr. 1992.*

Shahbazpanahi, S. et al., "Distributed Source Localization Using ESPRIT Algorithm", IEEE Transactions on Signal Processing, vol. 49, no. 10, Oct. 2001, pp 2169–2178.

Kozick, R. J. et al., "Distributed Source Localization with Mutiple Sensor Arrays and Frequency-Selective Spatial Coherence", IEEE Signal Processing Workshop on Statistical Signal and Array Processing, SSAP, 2000 IEEE, Los Alamitos, CA, USA 419–423.

(Continued)

*Primary Examiner*—Gregory C. Issing  
(74) *Attorney, Agent, or Firm*—Rankin, Hill, Porter & Clark LLP

(57) ABSTRACT

This invention relates to a method and system for the radio location of CDMA and non-CDMA enabled transmitters within a reception zone. The invention exploits the superposition of antenna patterns that create complex and asymmetrical interference structures at very small scales. By randomly distributing a random antenna array of M elements across a two or three-dimensional surface, fine scale interference structures on the scale of ¼ the carrier wavelength are generated. Once the minimum number of antennas are placed, additional antennas will not improve the resolution. Such interference structures when sampled at ⅛ the carrier wavelength or greater yields unique spatial patterns with respect to a given antenna array geometry and transmitter location. The invention incorporates signature recognition (matching) and orthogonal sub-space projection estimators to derive location estimates of a radio transmitter.

26 Claims, 9 Drawing Sheets

OTHER PUBLICATIONS

Holme, S., "Sparse and Irregular Sampling in Array Processing" ICASSP, IEEE International Conference on Acoustics, Speech and Signal Processing, Jun. 5–9, 2000, Istanbul, Turkey, pp 3850–3853.

Wu, Q. et al., "UN–MUSIC and UN–CLE: An Application of Generalized Correclation Analysis to the Estimation of the Direction of Arrival of Signals in Unknown Correlated Noise", IEEE Transactions on Signal Processing, vol. 42, No. 9, Sep. 1994, pp 2331–2343.

Schmidt, R., "Multilinear Array Manifold Interpolation", IEEE Transactions on Signal Processing, vol. 40, No. 4, (Apr. 1992), pp. 857–866.

Schmidt, R., "Multiple Emmitter Location and Signal Parameter Estimation," IEEE Transactions on Antennas and Propagation, vol. AP–34, No. 3, Mar. 1986, pp. 276–280.

Schmidt, R., "Multiple Source DF Signal Processing: An Experimental System," IEEE Transactions on Antennas and Propagation, vol. AP–34, No. 3, Mar. 1986, pp. 281–290.

* cited by examiner

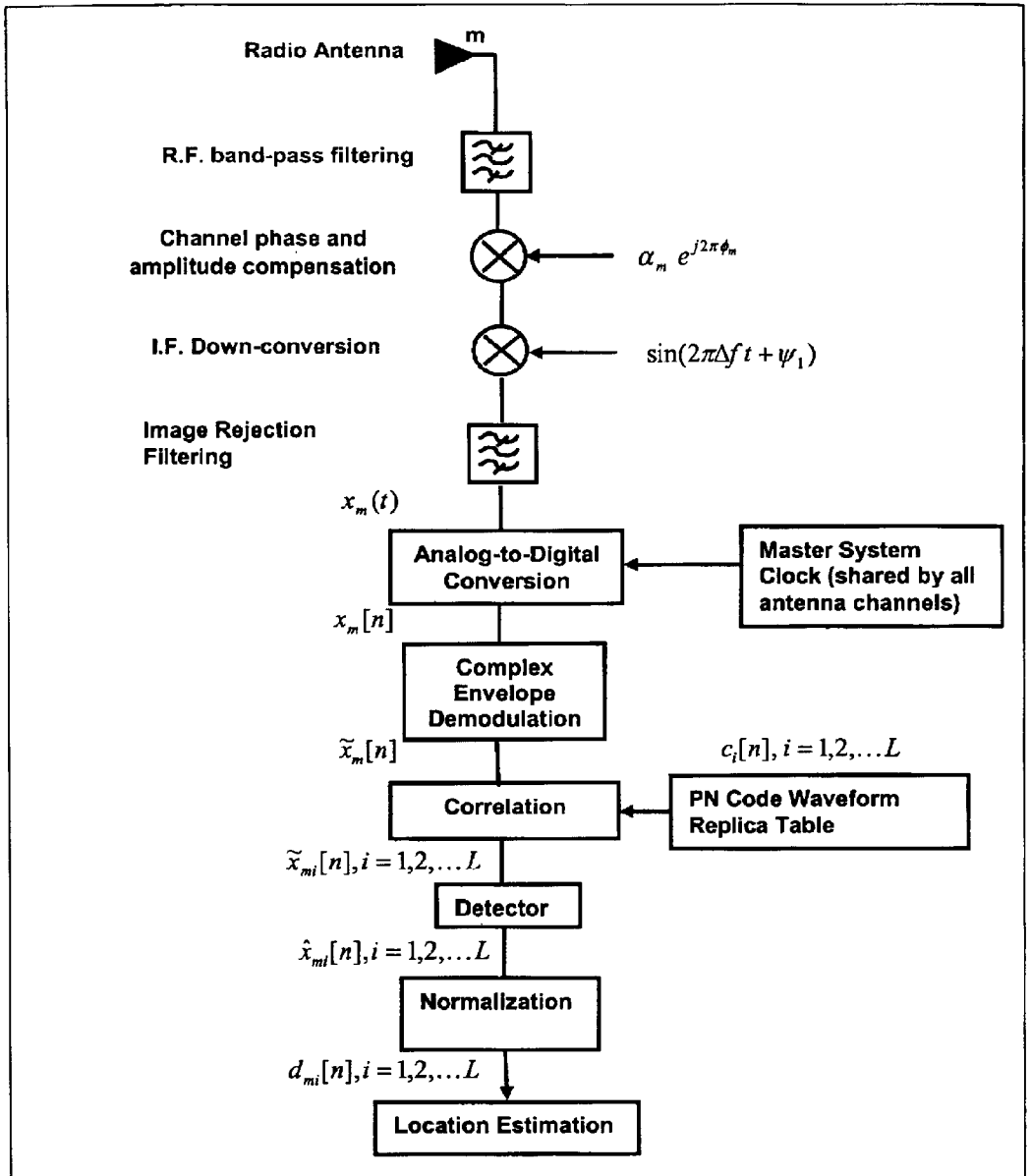
Figure 1  Front-end signal processing chain for m<sup>th</sup> antenna chain CDMA applications

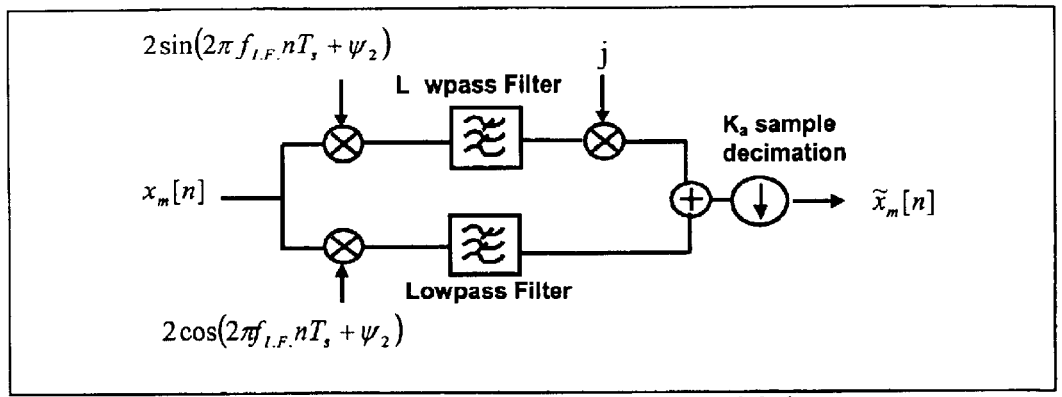
Figure 2     Complex Envelope OOK Demodulation
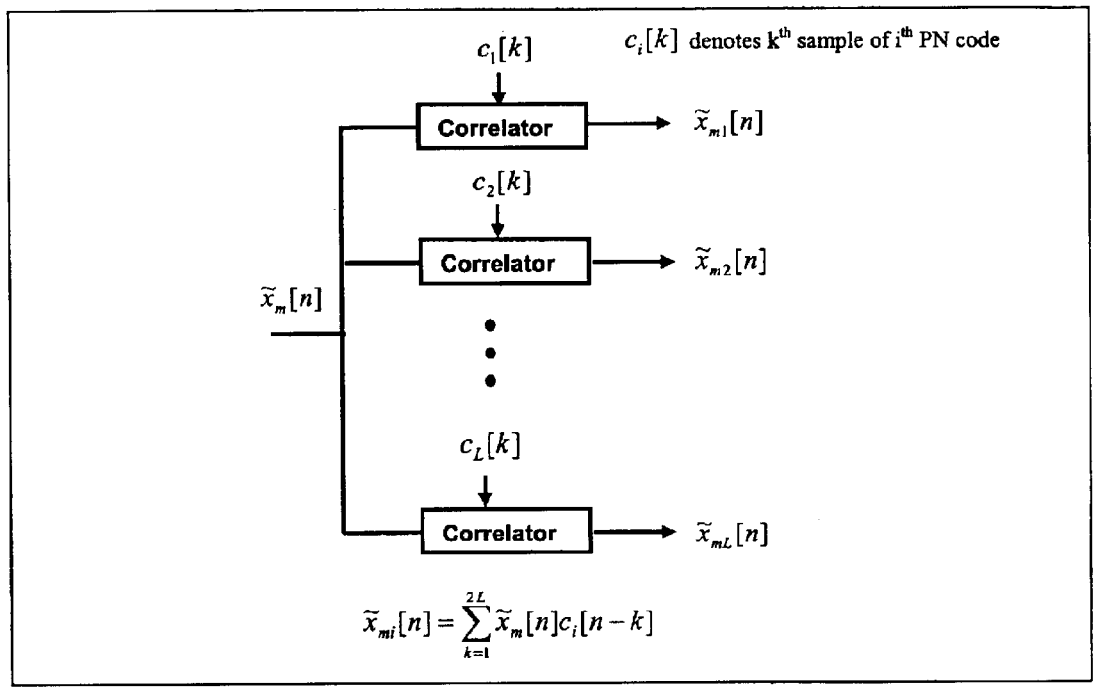
Figure 3     Correlator Operation

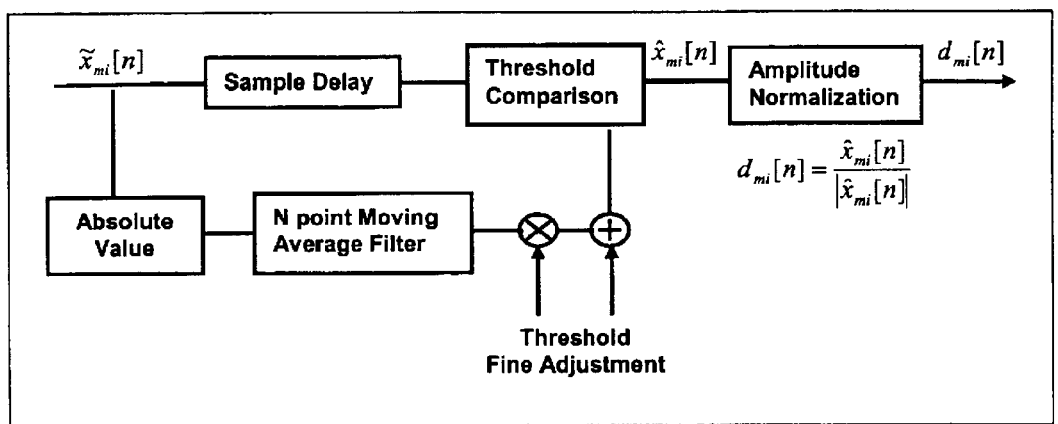
Figure 4    Threshold Generation and Normalization – $i^{th}$ code channel

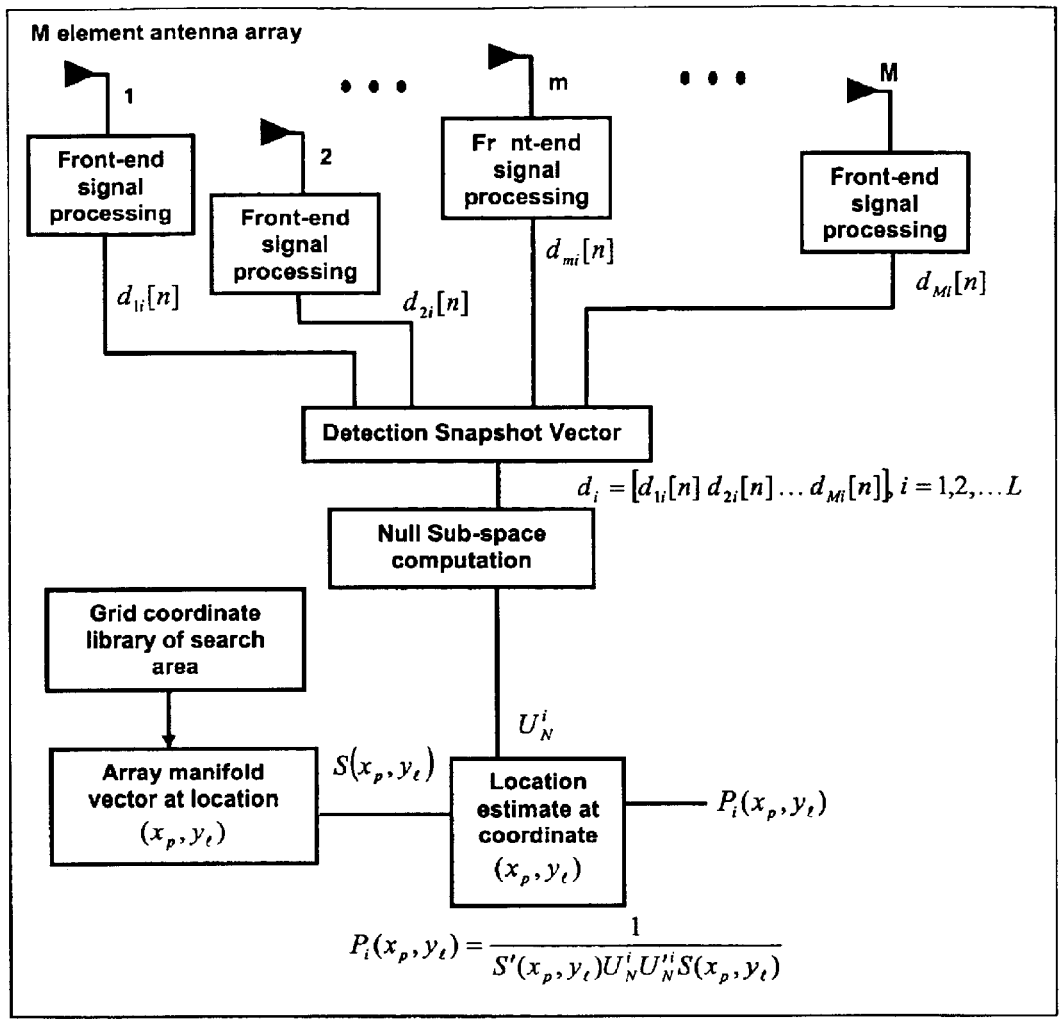
Figure 5    Radio Transmitter Location Estimation - Orthogonal Sub-space Projection
(processing for the ith PN Code)

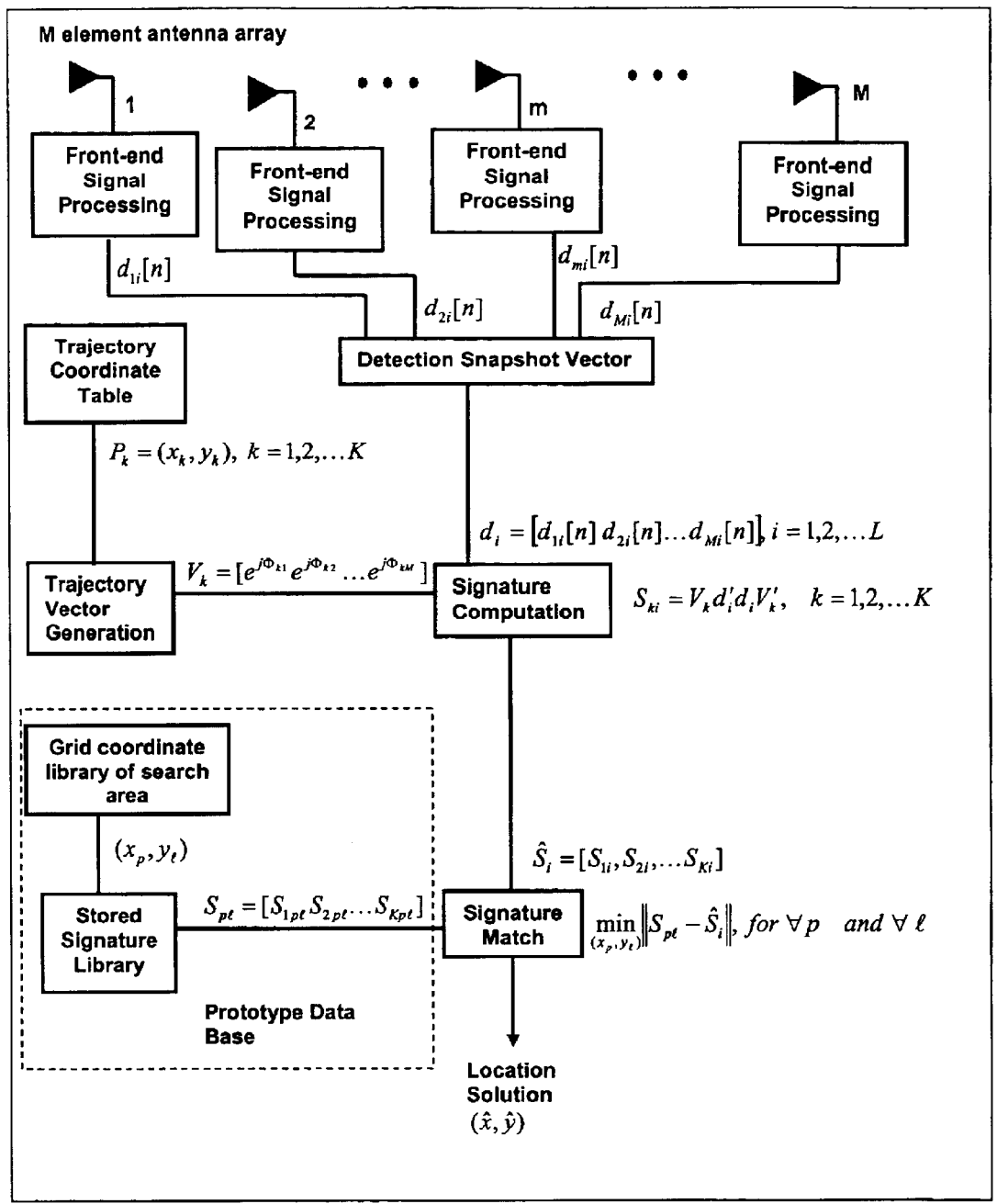
Figure 6  Radio Transmitter Location Estimation – Trajectory Signature Method
(processing for the $i^{th}$ PN Code)

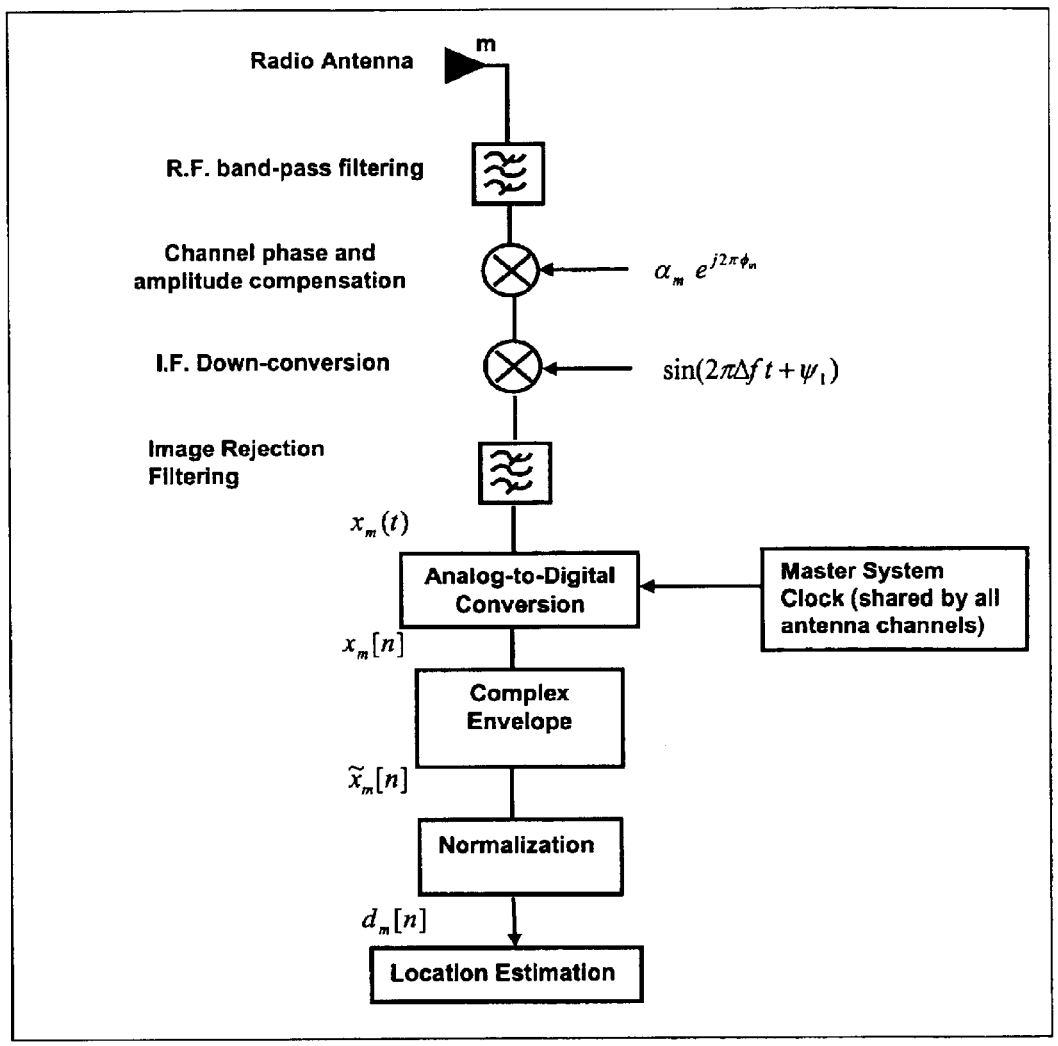
Figure 7   Front-end signal processing chain for $m^{th}$ antenna chain Non-CDMA applications

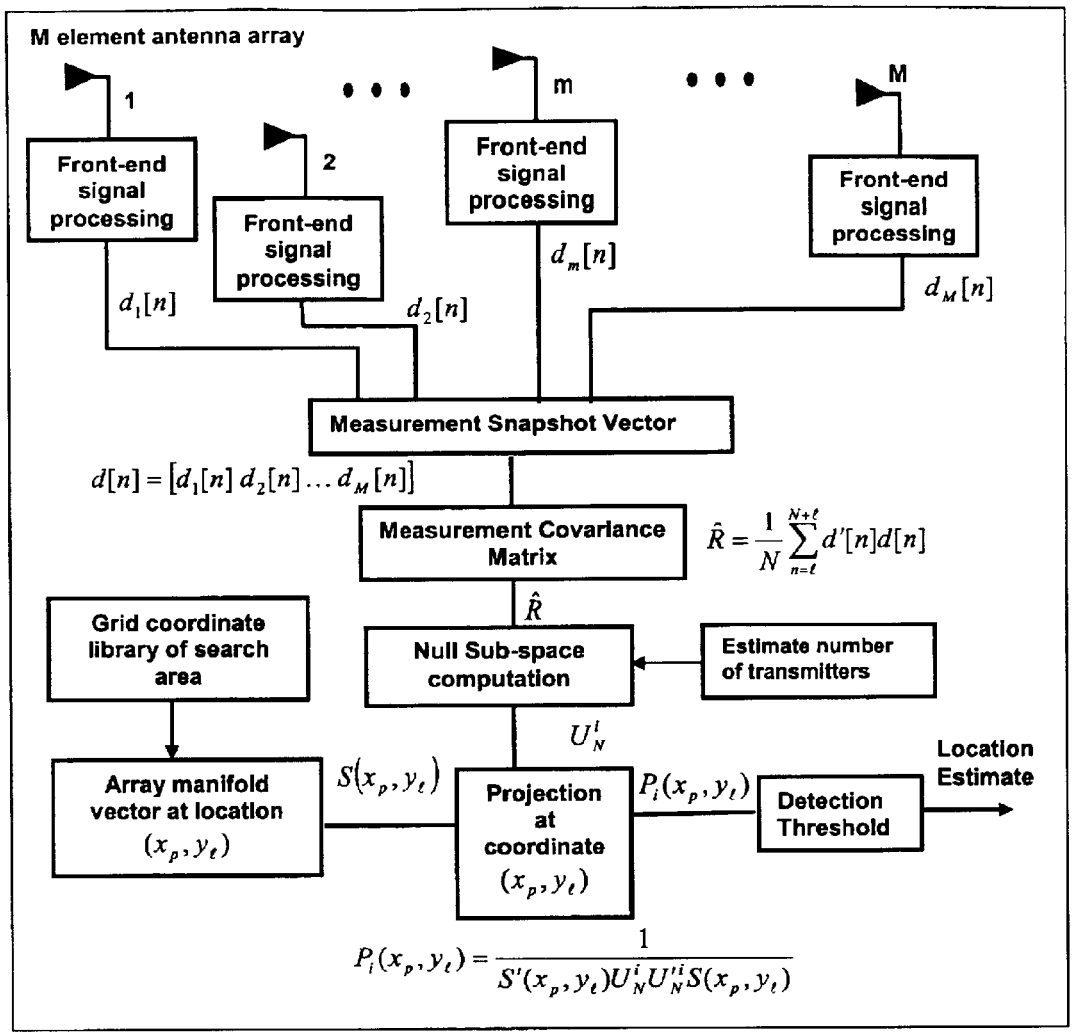
Figure 8   Radio Transmitter Location Estimation - Orthogonal Sub-space Projection
(Non-CDMA applications)

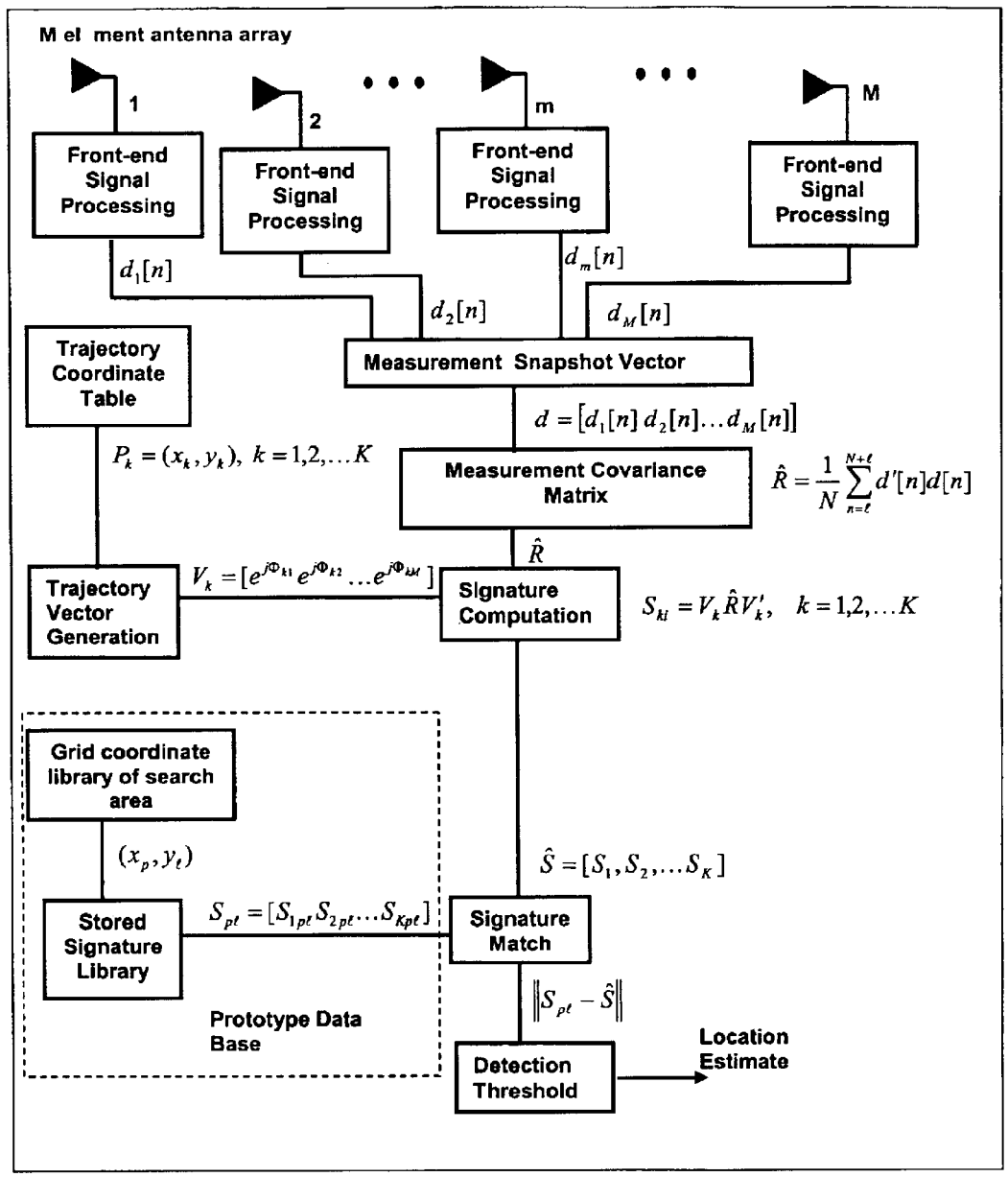
Figure 9   Radio Transmitter Location Estimation – Trajectory Signature Method
(Non_CDMA processing)

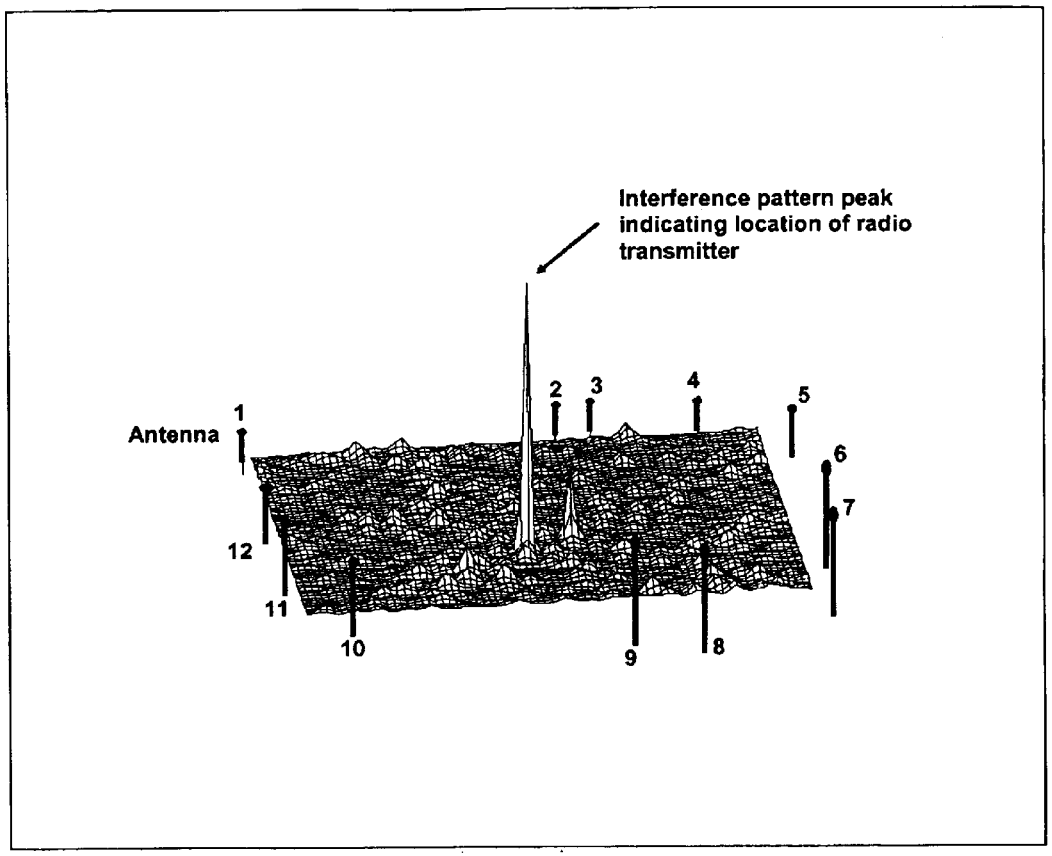
Figure 10    CDMA Interference pattern generated from a 12 element antenna array

RANDOM ANTENNA ARRAY INTERFEROMETER FOR RADIO LOCATION

FIELD OF THE INVENTION

This invention relates to a method and system for the accurate localization of multiple radio frequency signals over a large area. The innovation presented here was developed in the context of miniature (<1 gram) wildlife tracking devices, but is generalized to the problem of locating either CMDA or non-CDMA transmitters.

BACKGROUND

Despite the revolutions represented by GPS technology and advanced direction-of-arrival algorithms (DoA), the problem of determining precise (<1 m resolution) positions of wildlife radio transmitters remains to date essentially unsolved. There are a number of reasons for this, principal among them being the low-duty cycle nature of the signals (required by practical energy/payload constraints), which prevents coherent demodulation. Payload constraints (<1 gram for small species of animals) also preclude the inclusion of ultra-precise clocks into transmitters which in turn prevents the implementation of sub-meter precision time-of-arrival location methods.

Much of the existing work on radio location has been tailored to the CDMA based cellular telephony and GPS applications. Both these applications have the benefits of relatively high transmission power, coherent demodulation and stablity. Cellular telephony localization schemes are typically based on statistical measurement of signal strength, direction of arrival (DoA), time of arrival (ToA) or time difference of arrival (TDoA) as a means to position a radio source: Caffrey, J. J., *Wireless Location in CDMA Cellular Radio Systems*, (Kluwer academic Publishers: Norwell, Mass., 2000).

Although DoA methods such as beam forming can be applied to wildlife radio transmitter location finding, estimator precision will vary according to the number of antenna elements used and the relative location of the radio source from the antenna array. Moreover, unambiguous location finding by means of beamforming necessitates specific antenna geometries that could under field conditions restrict the applicability of the technique.

DoA methods based on orthogonal projection such as MUSIC (Schmidt, "Multiple Emitter Location and Signal Parameter Estimation," IEEE Transactions on Antennas and Propagation, vol. AP-34, No. 3, (March 1986), pp. 276–280,) offer improved precision performance over classic beamforming. Such methods present two drawbacks for wildlife monitoring. First, the number of radio sources that can be monitored cannot exceed the number of antennas. Typically, wildlife studies involve the simultaneous monitoring of large numbers of transmitter tagged animals. Second, an appropriate array manifold selection must be made (Schmidt, "Multilinear Array Manifold Interpolation", IEEE Transactions on Signal Processing, vol. 40, No. 4, (April 1992), pp. 857–866). This typically entails an empirical measurement of the antenna manifold. That is to say that a radio transmitter must be used to calibrate the system by moving the device across a fine grid of points encompassing the search area. In most animal monitoring applications the empirical calibration of the array manifold would be logistically or economically impractical.

Location finding based on ToA and TDoA techniques (including GPS) are geometry dependent (i.e. transmitter and receiver locations determine precision levels) and are precluded from use in small animal applications due to the inability to perform coherent demodulation and the current technological limitation of incorporating an ultra-stable clock source on-board a miniature (<1 gram) transmitter.

The measurement-based location-finding approach in Wax et al. in U.S. Pat. No. 6,104,344 (which is not admitted to be prior art with respect to the present invention by its mention in this Background section) provides an alternative to past radiolocation finding methods. The approach calls for a library of covariance matrix related signatures to be empirically collected across the search array. This library is then compared using a statistical technique against measured signatures from mobile transmitters to determine location. This approach, like the empirical DoA manifold method outlined by Schmidt, has limited applicability to wildlife tracking from a logistic, portability and economic perspective.

SUMMARY OF THE INVENTION

This invention allows radiolocation finding with a precision on the order of ¼ of the signal carrier wavelength by exploiting a virtual interference pattern created by combining phase measurements made by an antenna array and a library of complex vectors describing the phase relationship between individual antenna and hypothesized source locations. The random geometry of the antenna locations plays a key role in the invention.

A randomly distributed array of antennas exhibits a virtual interference pattern with fine scale fractal-like structure. As the number of antennas in the array increases the fine scale structure reaches a pattern of uniqueness in relation to the location of a radio source. The uniqueness property of the interference pattern in relation to the source location is revealed with a sufficiently small spatial sampling aperture.

In a preferred embodiment of the invention, CDMA enabled transmitters are located in the search area (reception zone) by first isolating the signal from one transmitter as received at multiple antennas. Separation of individual transmitter signals involves a form of replica code correlation that specifically preserves the phase information. A snapshot vector of phase information is formed for each detected transmitter and processed separately to form a localization estimate using either a direct search over the virtual interference pattern or by means of trajectory signature matching. This technique of signal separation allows orthogonal projection to be used when the number of transmitters in the reception zone exceeds the number of receiver antennas. An added benefit of the signal separation process is the effective reduction of noise power that results from CDMA coding gain. With coding gain, source location forgoes the need to explicitly time average snapshot vectors to compute a covariance matrix.

In another embodiment of the invention, non-CDMA enabled transmitters can be located by building an interference pattern and performing a location search directly without first isolating the signal of interest. Two additional operations are required to support radiolocation of non-CDMA transmitters. First, prior to location estimation the number of transmitters captured by the snap shot covariance matrix must be identified. This operation defines the dimensionality of the covariance matrix noise sub-space and determines the number of transmitter peaks present in the interference pattern. There are a number of information-theoretic methods known in the art that can be used to perform this estimation.

Second, non-CDMA operation requires a full rank snapshot vector covariance matrix to be computed. For CDMA transmitters this requirement is not required since the signal dimensionality of the snapshot covariance matrix will always equal one. Moreover, without coding gain, noise power can only be reduced by the explicit time averaging of snapshot vectors to compute a covariance matrix statistic. The period of noise averaging will be dictated by the stationarity of aggregate radio sources within the reception zone of the antenna array.

The covariance matrix, used by either orthogonal projection or trajectory signature matching, has a maximum rank or dimensionality bounded by the number of antennas in the array, M. Essentially; the covariance matrix cannot retain information on more than M transmitters. For CDMA radiolocation this bound has no impact on the ability to simultaneously monitor more sources than antennas. However, without the ability to perform signal separation, the number of transmitters cannot exceed M for non-CDMA radiolocation.

Multi-path propagation is ubiquitous in radio. Prior art has used a number of methods in an attempt to either eliminate specular reflection from antenna measurements or by incorporating a multi-path model, typically through empirical measurement, into the location estimation process. By increasing the number of antennas in the array, the invention reduces the coherence of multi-path measurements thereby eliminating peaks in the interference pattern due to specular reflection.

The invention is applicable to radiolocation for continuous wave (CW) and low duty cycle pulsed radio devices.

DETAILED DESCRIPTION

FIGS. 1 to 5 describe the invention with respect to orthogonal sub-space projection of an individual detection snapshot vector taken from a CDMA enabled transmitter. FIG. 6 describes signature matching as an alternative to orthogonal sub-space projection. FIGS. 7 through 9 provide a generalization of both methods to non-CDMA signal localization.

FIG. 1 is a flow chart showing the front-end signal processing chain for $m^{th}$ antenna chain CDMA applications.

FIG. 2 is a block diagram of showing Complex Envelope OOK Demodulation, which appears as a single block in the flow chart of FIG. 1.

FIG. 3 is a block diagram showing the Correlation function used to decouple individual CDMA transmitter signals from one another.

FIG. 4 is an expanded view of the Normalization block in the flow chart of FIG. 1.

FIG. 5 is a flow chart showing the location estimation based on pure phase angle of arrival information for a single pseudo random PN code decoupled from other CDMA signals. This figure assumes the front-end signal processing chain shown in FIGS. 1 through 4

FIG. 6 is a flow chart showing an extension to the location estimation method of FIG. 5 based on a trajectory of selected points on the interference pattern.

FIG. 7 is a flow chart generalizing the front-end signal processing chain for $m^{th}$ antenna chain applications system shown in FIG. 1 to the non-CDMA case, where multiple transmitter signals cannot be directly decoupled from one another.

FIG. 8 shows the location estimation technique applicable in the non-CDMA case for using an averaged covariance matrix and a pre-computed estimate of the number of transmitters.

FIG. 9 shows an extension of the signature-matching embodiment to non-CDMA radiolocation.

FIG. 10 shows an example of an interference pattern generated for a CDMA encoded transmitter and a random array of 12 antennas.

GENERAL DESCRIPTION

The invention describes a system and method for locating transmitters to a known precision using a virtual interference pattern of expected phase difference of arrival signals from hypothetical transmitters transmitting from grid points within the boundaries of a random antenna array.

To estimate source location the virtual inference pattern can be fully exposed by using orthogonal projection or by examining a trajectory of limited points across the pattern. The virtual interference pattern can be thought of in terms of weighting the measured signal at each antenna by a set of complex exponentials representing the relative phase delays from each point in the space. This gives, for every point in the space a sum of sinusoids of the form $$\sum_k |\cos(\theta_k - \varphi_k)|^2$$

Where $\theta_k$ and $\phi_k$ are the relative phase delays at the $k^{th}$ antenna for the received signal and the hypothetical signal originating from spatial grid location $\omega=(x,y)$, respectively. The sum of sinusoidal terms will have a maximum where the argument $(\theta_k-\phi_k)$ is equal to any multiple of $\pi$, or, equivalently where the relative distances to the antenna from the transmitter and the point $\omega=(x,y)$ are related by an integer multiple of half the wavelength (including, of course, zero). The loci of maximum values (where the real and hypothetical "signals" interfere constructively) are circles. If the antenna location is $(x_k,y_k)$ and the distance from the transmitter to the antenna is $d_k(\omega)=\sqrt{(x-x_k)^2+(y-y_k)^2}$, these circles have the equation:

$$(x-x_k)^2+(y-y_k)^2=(d_k+n\lambda/2)^2, n\in I^+$$

When the interference pattern is fully exposed, the underlying structure of constructive and destructive interference reveals maxima, or points of magnification in which phase differences of arrival overlap constructively forming very narrow boundary effects or caustics. Such points correspond to potential source locations, with the global maximum corresponding to the location of the true signal. Alternatively, sampling a trajectory across a sufficient number of points in the interference pattern yields a unique signature vector. By comparing the measured signature vector to a stored library of hypothesized signatures a source location estimate can be made. Whether source location is extracted through searching the entire interference pattern or by generating a trajectory signature across a sub-set of points on the pattern, a direction angle is never computed; instead a phase signature is essentially compared with hypothetical signatures for all possible locations in the array area to yield the source position directly.

In practice, the interference pattern is built not from the received signal itself but by treating the pattern as an orthogonal projection in the "noise subspace" of the measured signal covariance matrix. In other words, for an M element antenna array, we search the set of hypothetical signals looking for the peaks of a "spectrum" given by $$P(\omega) = \frac{1}{\sum\limits_{k=m+1}^{M} |\beta'_k a(\omega)|^2}$$

Where $\beta_k, k=m+1, \ldots M$ denotes the noise eigenvectors of the measured signal covariance matrix. Here the dimension of the noise sub-space is taken to be M−m, such that m defines the number of independent signals encapsulated by the covariance matrix of antenna snapshot vectors. Linear arrays translate signal delays into angles of arrival (of plane waves), so that $\alpha(\omega)$ corresponds to a direction vector, and the parameter $\omega$ is the hypothesized incidence angle. Alternatively, the invention operates from a non-linear array that translates phase delays into locations in space, where $\alpha(\omega)$ is the vector of relative phase delays of a hypothetical signal originating at a point $\omega=(\hat{x},\hat{y})$.

To see the connection with the virtual interference pattern, note that for the case of one sinusoidal signal the signal subspace eigenvector $\beta_1$ will be identical with the baseband signal vector itself. If, instead of looking for zeros in the noise subspace, we were to look for a maximum in the signal subspace, the spatial spectrum would take the form $$P(\omega)=|\beta_1'\alpha(\omega)|^2=|\alpha(\xi)'\alpha(\omega)|^2$$

Where $\alpha(\xi)$ is the vector of delays corresponding to the measured signal. Each of these products, for a given value of the location estimate $\omega=(x,y)$, is a sum of sinusoids of the form $$P(\omega) = \sum_{k=1}^{M} e^{j2\pi(d_k(\xi)-d_k(\omega))/\lambda}$$

When $\omega=\xi$ the terms of $P(\omega)$ add in phase resulting in an interference pattern peak at the source location.

The invention claims that a system can be designed to ensure with high probability that only one peak will occur for a given transmitter signal. For CDMA signals, there will be one peak per interference pattern. For non-CDMA signals, the number of peaks in the interference pattern will correspond to the number of transmitters. The practitioner positions an antenna array and computes a library of manifold vectors, one for each grid point. The array may be tested for uniqueness using the perturbations of hypothetical transmissions originating at points on the sample grid, or by evaluating a set of hypothetical signals on a "worst-case" alternate grid (offset by ½ of a sampling interval from the sample grid). The hypothesized transmitter signals are processed by the location algorithm to ensure that the test locations generate true maxima (at or near the closest points on the sample grid). If ambiguities are found, additional antennas can be added to the search area, and/or the spatial sampling rate may be increased, and the experiment repeated until a suitable differential exists between the hypothesized location and any near matches. The signature method may require a different number of antennas than the orthogonal projection method and a different threshold.

DESCRIPTION OF PREFERRED EMBODIMENTS

The invention can be described with reference to 4 preferred embodiments.

The first embodiment is shown in FIGS. 1 through 5 where the localization of a CDMA enabled transmitter is effected using a single detection snapshot vector. The invention is applicable to all forms of radio CDMA transmission and applicable modulation schemes based on PN signal encoding, including CW communication signals and low duty cycle transmissions. In the example, an L-bit PN code family defines the transmit symbol library used in modulating a carrier by means of on-off-keying (OOK) signalling and a fixed code transmission rate.

Derivation of a location estimate requires a number of signal processing stages. These processing stages are described for the $m^{th}$ antenna as follows:

1. An antenna array consisting of M antenna elements is organized in a random pattern, with the elements distributed so that the outer boundary of the array defines the search area. The invention claims that any random distribution of antenna elements within a pre-defined study area will generate a unique and precise estimate of transmitter position provided the number of antennas used is greater than a fixed minimum. Thereafter, further antennas will not increase the resolution of the system beyond ¼ wavelength. However, increasing the number of antennas will reduce multi-path coherence, thereby eliminating peaks in the interference pattern due to specular reflection.

2. FIG. 1 shows the front-end processing stages of the $m^{th}$ antenna channel. Prior to digitization of the signal, the antenna output is band-limited, equalized for amplitude and phase imbalances and down-converted to an I.F. frequency.

3. Analog-to-digital conversion takes place at an intermediate frequency (I.F.) using a sampling rate of $T_s$ (seconds) to generate the real sampled signal, $x_m[n]$ (FIG. 1). Nyquist sampling is assumed, so that all signal information is contained in a band located below the ½ sampling frequency point. A common master clock maintains sampling phase coherence across all antenna channels to prevent signal phase distortion.

4. Generation of the complex envelope $\tilde{x}_m[n]$ (FIG. 2) provides OOK demodulation while preserving signal phase information. Envelope generation is performed coherently for CW signals assuming sufficient signal-to-noise ratio (SNR), or non-coherently, for low duty cycle burst signaling and low SNR CW signals. Following demodulation, a sample decimation operation, rate $K_s$, creates a sequence at two times the code rate.

5. PN code replicas are stored as a library of sampled square waveforms. Each stored waveform consists of a 2×L sample sequence of +1 and −1 representing binary code bit samples (FIG. 3). The code waveforms are sampled at two times the code rate.

6. When a transmitter is operating within the reception zone of the antenna array, a correlation operation (FIG. 3) matches the input sample sequence with a stored code replica while preserving signal phase information. Correlation is performed for each PN code stored in the library. The auto and cross correlation properties of PN codes provide the means of code discrimination through coding gain.

7. The correlation operation (FIG. 3) results in a superposition of complex phase samples associated with an individual transmitter signal. For signal samples not matched to a stored code replica, superposition does not occur. When signals overlap in time, as would occur when multiple transmitters are inside the reception area of the antenna array, the inherent coding gain of the system enhances through superposition the phase information of one signal while suppressing phase information from other overlapped transmissions. This property of the CDMA embodiment creates virtual interference patterns for each transmitter. Moreover, the ability to isolate each transmitter in this manner enables the embodiment to simultaneously monitor more transmitters than there are antennas.

8. The detector operation (FIG. 4) creates a threshold level based on the time varying low-pass envelope of each correlator output. When the correlator output exceeds the threshold a detection event is registered. Other transmitted codes that have not been matched to a stored replica result in a correlator output that does not exceed the detector threshold.

9. Environmental factors and related propagation mechanisms will cause the magnitude of a detection event to vary according to time and geography. The output of the detector for each antenna (FIG. 4) is normalized to unity, removing propagation loss dependencies from entering the location estimation process.

10. Following front-end signal processing (FIG. 1), detection information from the antenna array is formed into a measurement snapshot vector for each PN code (FIG. 5). The snapshot vector encapsulates the phase information of a single transmission event as measured across the antenna array.

11. A null space is defined through an orthogonal partitioning of the snapshot vector into signal and noise only subspaces by means of singular value decomposition (FIG. 5). The subspaces retain phase-difference-of-arrival information between antenna pairs of the received signal.

12. Since detection is performed prior to the formulation of the snapshot vector, the dimensionality of the signal sub-space will be fixed to one, regardless of the number of transmitters within the reception range of the antenna array. (Except of course when there are no transmitters, in which case the dimensionality of the signal sub-space is zero.) This is a key element of front-end signal processing exploited by the invention. The invention can operate when the number of transmitters in the reception zone is variable or exceeds the number of antenna array elements.

13. Location estimate computation is then performed using orthogonal sub-space projection (e.g. MUSIC). A location estimate is formed by projecting an array manifold vector (modeled as the snapshot vector corresponding to a hypothesized transmitter at a specific set of coordinates) onto the noise subspace of the measurement snapshot vector. The projection operation is performed across a pre-stored uniform set of grid point locations (FIG. 5) defining the search area. The spacing of the grid must be less than or equal to ⅛ the carrier wavelength of the transmitted signal. In general the finer the grid, the smaller the minimum number of antennas required for a unique solution. A location estimate is defined by the largest amplitude projection across the set of grid points. This approach yields location estimates with a precision of ±¼ of a wavelength.

FIG. 6 describes the second preferred embodiment of the invention where the CDMA radio transmitter localization technique employs a trajectory of sample points on the virtual interference pattern. When a K>>M sample point random trajectory is selected through the interference pattern a unique signature is generated. A transmitter location estimate is determined through comparing the resulting signature to a database of prototypes. FIG. 6 describes the invention as it may be applied to CDMA radio transmitter localization applications using trajectory signature matching.

1. The formation of the detection snapshot vector takes place in the same manner as described in FIGS. 2 through 4.
2. A pre-selected K point sample trajectory (Cartesian coordinates $P_k=[x_k,y_k]$, k=1,2, . . . K) defines the trajectory vector $V_k$, where the phase term $\Phi_{km}$ is a function of the $k^{th}$ location along the trajectory and the $m^{th}$ antenna location. The shape of the sample trajectory is arbitrary.
3. The number of sample points associated with the trajectory is selected to be greater than the number of antenna elements, K>>M to ensure uniqueness of the trajectory signature.
4. Signature samples for the $I^{th}$ PN code are generated by the product of K trajectory vectors with the PN code detection snapshot vector, $S_{ki}=V_k d_l' d_l V_k'$, k=1,2, . . . K.
5. A location estimate is formed by finding the nearest match of a prototype vector, $S_{pt}$, with the measured trajectory signature, $\hat{S}S_{pt}$. The criterion for the best match is the minimum geometric distance between $S_{pt}$ and $\hat{S}S_l$. A prototype vector is required for each grid point on the virtual interference pattern.

FIGS. 7 through 9 describe the third (orthogonal projection) and fourth (signature matching) preferred embodiments of the invention as it may be applied to non-CDMA applications including those based on transponding architectures for both orthogonal projection and signature matching.

1. An antenna array consisting of M antenna elements are located in a random pattern distributed where the outer boundaries of the array define the search area of interest. The invention claims that any random distribution of antenna elements within a pre-defined study area will generate a unique and precise estimate of transmitter position.
2. FIG. 7 shows the front-end processing stages of the $m^{th}$ antenna channel. Prior to digitization of the signal, the antenna output is band-limited, equalized for amplitude and phase imbalances and down-converted to an I.F. frequency.
3. Analog-to-digital conversion takes place at an intermediate frequency (I.F.) using a sampling rate of $T_s$ (seconds) to generate the real sampled signal, $x_m[n]$ (FIG. 7). A common master clock maintains sampling phase coherence across all antenna channels to prevent signal phase distortion.
4. Generation of the complex envelope $\tilde{x}_m[n]$ (FIG. 2) provides demodulation to baseband while preserving signal phase information. Envelope generation is performed coherently for CW signals assuming sufficient signal-to-noise ratio (SNR). Or non-coherently, for low duty cycle burst signaling and low SNR CW signals. Following demodulation, a sample decimation operation, rate $K_s$, is used to minimize computation.
5. Environmental factors and related propagation mechanisms will cause the magnitude of a detection event to varying according to time and geography. The output of the demodulator is normalized to unity, removing propagation loss dependencies from entering the location estimation process.
6. The measurement snapshot vector, d[n], is formed from the output of each front-end processing channel (FIGS. 8 and 9).
7. For orthogonal projection (FIG. 8) and signature matching (FIG. 9), a covariance matrix estimate, $\hat{R}$, is formed by averaging the outer products of N >M measurement snapshot vectors.
8. For orthogonal projection (FIG. 8) the null space computation requires an estimate of the number of transmitters captured within the snapshot covariance matrix. Prior art, based on information theoretic metrics (AIC,MDL), are used to estimate the number of transmitters and correspondingly, the signal subspace dimension of $\hat{R}$.
9. The null space of $\hat{R}$ is defined through an orthogonal partitioning of the matrix into signal and noise by means of singular value decomposition (FIG. 8). The orthogonal partitioning preserves phase-difference-of-arrival information between antenna pairs and transmitters inside the reception area of the antenna array. For non-CDMA signaling, the invention is restricted to cases where the number of transmitters is less than the number of antenna elements.

10. Location estimate computation is performed using orthogonal sub-space projection (e.g. MUSIC). Transmitter location estimates are formed by projecting an array manifold (modeled as the signal component of the observation vector corresponding to a hypothesized transmitter at a specific set of coordinates $x_p, y_t$), onto the noise sub-space of $\hat{R}$. A detection threshold level is applied to the output of the projection operator to differentiate signal from noise (FIG. 8).

11. The system can use a signature matching approach instead of the procedure outlined in step 10 above. Signature matching (FIG. 9) is performed using a pre-selected K point sample trajectory (Cartesian coordinates $P_k=[x_k,y_k]$, k=1,2, . . . K) which defines the trajectory vector $V_k$, where the phase term $\Phi_{km}$ is a function of the $k^{th}$ location along the trajectory and the $m^{th}$ antenna location. The shape of the sample trajectory is arbitrary.

12. The number of sample points associated with the trajectory is selected to be greater than the number of antenna elements, K>>M to ensure uniqueness of the trajectory signature.

13. Signature samples are generated by the product of K trajectory vectors with the covariance matrix $\hat{R}$, $S_{kj}=V_k\hat{R}V_k'$, k=1,2, . . . K (FIG. 9).

14. A location estimate is formed by first computing the geometric distance between $S_{pt}$ and $\hat{S}$ then comparing the result with a detection threshold level (FIG. 9).

This invention is particularly useful in monitoring wildlife. A tag with a CDMA enabled transmitter is affixed to an animal and the animal is released into the wild. The tag collects data on the animal and broadcasts the data every couple of seconds using the pseudo random number code. When a transmitted signal is received, in addition to retrieving the data, the receiver stores phase information on the received signal that is ultimately used according to the methods described in the first and second preferred embodiments above.

FIG. 10 shows the interference pattern generated by a single 50 MHz CDMA transmitter over an area of approximately 100 meters by 100 meters. The propagation environment was subject to random sources of specular multipath. An array of dipole antennas were randomly placed around the periphery of the study area. To achieve a unique position estimate the interference pattern was sampled at ⅛ the wavelength or 0.75 meters.

Similarly, non-CDMA enabled tags can be affixed to targets and located according to the third and fourth preferred embodiments. Where orthogonal projection methods are used without a signature sample of K trajectory vectors, the number of targets tracked at any one time is limited to one less than the number of receivers.

The present invention has been described with respect to low powered CDMA enabled tags in a wildlife tracking scenario. It will be appreciated by those of ordinary skill in the art that, in light of the present disclosure, the system and methods described allow for radio-location using the interferometry patterns, without departing from the intended scope of the invention. All such modifications are intended to be included within the scope of this disclosure.

What is claimed is:

1. A method for locating one or more transmitters within a search area using an array of antennas, the one or more transmitters transmitting signals having the same carrier frequency, and the array of antennas operating on a common clock signal, the method comprising the following steps:

(a) specification of a grid of possible grid point locations covering the search area, adjacent grid point locations being a distance equal to a predetermined fraction of the wavelength of the carrier frequency apart, said predetermined fraction being less than or equal to ⅛;

(b) establishment of a library of manifold vectors, one for each grid point location, describing the phase interrelationships between a hypothetical carrier frequency signal emanating from said grid point location and the signal as received by all antennas;

(c) reception and digitization of one or more signals by the array of antennas to determine snapshot vectors containing phase angles of arrival information for the one or more signals at each antenna;

(d) computation of a covariance matrix for the snapshot vectors over all antennas;

(e) combination of the covariance matrix or a submatrix thereof with each manifold vector in the library to create a virtual interference pattern for the one or more signals; and (f) selection as possible locations for the transmitters those grid point locations where the associated value of the virtual interference pattern exhibits a maximum value, and exceeds a threshold representing a null hypothesis;

whereby the possible locations for the transmitters have a precision of ¼ wavelength.

2. The method of claim 1 wherein the combination of the covariance matrix or a submatrix thereof with each manifold vector in the library is the orthogonal projection of each manifold vector onto the noise subspace of the covariance matrix, said noise subspace formed by singular value decomposition of the covariance matrix into its signal subspace and noise subspace components.

3. The method of claim 1 wherein the signals are generated by transmitters using a CDMA code, which CDMA code is used to separate the signal associated with each transmitter in a way that preserves the phase angle of arrival information for each such signal, whereby the method can locate transmitters independently and can locate more transmitters than antennas.

4. The method of claim 1 further comprising a step for estimating the number of signals received, and hence the number of transmitters being considered, by forming and averaging covariance matrices over time, whereby the method can determine the locations of a number of non-CDMA enabled transmitters transmitting at the same time equal to one less than the number of antennas in the antenna array.

5. The method of claim 1 wherein the signals are continuous wave signals.

6. The method of claim 1 wherein the signals are short duty cycle signals.

7. The method of claim 1 wherein antennas are added to the array to attenuate the effects of multipath propagation.

8. A system for locating one or more radio transmitters within a search area, the transmitters transmitting signals at a carrier frequency, the system comprising:

(a) a grid of possible grid point locations covering the search area, adjacent grid point locations being a distance equal to a predetermined fraction of the wavelength of the carrier frequency apart, said predetermined fraction being less than or equal to ⅛;

(b) an array of antennas positioned at infrequent intervals around the search area at known locations relative to the grid and operating on a common clock;

(c) a library of manifold vectors, one for each grid point location, describing the phase interrelationships between a hypothetical signal at the carrier frequency emanating from said grid point location and said signal as received by all antennas;

(d) means for detecting and processing the transmitter signals to extract a snapshot vector containing phase angle of arrival information of the transmitter signals at each antenna;

(e) means for computing a covariance matrix for the phase angle of arrival of the transmitter signals and for combining the signal covariance matrix with each manifold vector in the library to produce a virtual interference pattern;

(f) means for selecting one or more points in the virtual interference pattern that exceed a threshold as the locations for the signals of interest.

9. The system of claim 8 wherein the signals are generated by transmitters using a CDMA code, which CDMA code is used to separate the signal associated with each transmitter in a way that preserves determination of the phase angle of arrival for each such signal.

10. The system of claim 8 further comprising means for estimating the number of signals received, and hence the number of transmitters being considered, by forming and averaging snapshot vector covariance matrices over time.

11. The system of claim 8 wherein antennas are added to the array to attenuate the effects of multipath propagation.

12. The system of claim 8 wherein the means for selecting one or more points in the virtual interference pattern involves the orthogonal projection of each manifold vector with the noise subspace of the covariance matrix, said noise subspace formed by singular value decomposition of the covariance matrix into its signal subspace and noise subspace components.

13. The system of claim 8 further comprising a library of hypothesized signature vectors wherein the means for selecting the one or more points in the virtual interference pattern involves comparing the corresponding points in the virtual interference pattern with the hypothesized signature vectors.

14. The system of claim 8 wherein the signals are continuous wave signals.

15. The system of claim 8 wherein the signals are short duty cycle signals.

16. A method for locating one or more transmitters within a search area using an array of antennas, the one or more transmitters transmitting signals having the same carrier frequency, and the array of antennas operating on a common clock signal, the method comprising the following steps:

(a) specification of a grid of possible grid point locations covering the search area, adjacent grid point locations being a distance equal to a predetermined fraction of the wavelength of the carrier frequency apart, said predetermined fraction being less than or equal to ⅛;

(b) establishment of a library of manifold vectors, one for each grid point location, describing the phase interrelationships between a hypothetical signal at the carrier frequency emanating from said grid point location and the signal as received by all antennas;

(c) selection of a signature of known grid point locations positioned relative to a grid point in question;

(d) establishment of a library of hypothesized signature vectors, one for each grid point location, the elements of the signature vector corresponding to the signature of known grid point locations, and the value of each element of the signature vector being a combination of the manifold vector at the grid point location in question to the manifold vector at the grid point location corresponding to said element;

(e) reception and digitization of one or more signals by the array of antennas to determine snapshot vectors containing phase angles of arrival information for the one or more signals at each antenna;

(f) computation of a covariance matrix for the snapshot vectors over all antennas;

(g) combination of the covariance matrix or a submatrix thereof with each manifold vector in the library of manifold vectors to create a virtual interference pattern for the one or more signals;

(h) comparison of the library of signature vectors with corresponding values of the virtual interference pattern and selecting as the possible locations for the transmitters those matches that exhibit a maximum value, and are greater than a threshold representing a null hypothesis;

whereby the possible locations for the transmitters have a precision of ¼ wavelength.

17. The method of claim 16 wherein the signals are generated by transmitters using a CDMA code, which CDMA code is used to separate the signal associated with each transmitter in a way that preserves determination of the phase angle of arrival for each such signal, whereby more the method can locate transmitters independently and can locate more transmitters than antennas.

18. The method of claim 16 further comprising a step for estimating the number of signals received, and hence the number of transmitters being considered, by forming and averaging snapshot vector covariance matrices over time.

19. The method of claim 16 wherein the signals are continuous wave signals.

20. The method of claim 16 wherein the signals are short duty cycle signals.

21. The method of claim 16 wherein antennas are added to the array to attenuate the effects of multipath propagation.

22. An antenna array for locating one or more transmitters transmitting at a carrier frequency within a search area at a resolution of ¼ of the wavelength of the carrier frequency, the search area identified by a grid of possible grid point locations wherein adjacent grid point locations are a distance less than or equal to ⅛ of the wavelength of the carrier frequency apart, the antenna array comprising:

(a) a number of antennas positioned about the search area, at known locations relative to the grid, and operating on a common clock;

(b) means for computing a library of manifold vectors, one for each grid point location, describing the phase interrelationships between a hypothetical transmitter signal emanating from each grid point location and said signal as it would be hypothetically received by all antennas;

(c) means for computing one or more calibration covariance matrices, each calibration covariance matrix representing a modeled response of the antenna array to a modeled transmitter signal emanating from a calibration transmitter location within the search area;

(d) the number of antennas sufficiently large that for all calibration transmitter locations in a set of calibration transmitter locations, a combination of the calibration covariance matrix corresponding to a particular calibration transmitter location in the set with the library of manifold vectors creates a virtual interference pattern for the antenna array having a unique maximum at the grid point location nearest to the particular calibration transmitter location.

23. The antenna array of claim 22 wherein the set of calibration transmitter locations has at least one calibration transmitter location at a distance of no more than 1/16 of the wavelength of the carrier frequency away from each grid point.

24. The antenna array of claim 23 wherein antennas are added to the array to attenuate the effects of multipath propagation.

25. The antenna array of claim 23 wherein individual antennas are repositioned to increase linear independence of the library of manifold vectors.

26. The antenna array of claim 23 wherein the number of antennas is sufficiently large such that the difference between the unique maximum and a next largest value in the virtual interference pattern exceeds a threshold representing a null hypothesis.

* * * * *